United States Patent [19]

Tsou et al.

[11] 4,246,087
[45] Jan. 20, 1981

[54] PROCESS FOR CATIONIC ELECTRODEPOSITION

[75] Inventors: Ivan H. Tsou, Bloomfield Hills; Marc L. Smith, Warren, both of Mich.

[73] Assignee: Grow Group, Inc., New York, N.Y.

[21] Appl. No.: 963,032

[22] Filed: Nov. 22, 1978

Related U.S. Application Data

[63] Continuation-in-part of Ser. No. 859,295, Dec. 12, 1977, Pat. No. 4,155,824.

[51] Int. Cl.$^3$ .............................................. C25D 13/08
[52] U.S. Cl. .................................. 204/181 C; 427/386
[58] Field of Search ...................... 204/181 C; 427/386

[56] References Cited

U.S. PATENT DOCUMENTS

| | | | |
|---|---|---|---|
| 2,676,166 | 4/1954 | Webers | 260/85.7 |
| 4,000,781 | 1/1977 | Knapp | 427/386 |
| 4,038,166 | 7/1977 | Bosso et al. | 204/181 C |
| 4,046,729 | 9/1977 | Scriven et al. | 204/181 C |
| 4,055,541 | 10/1977 | Riew | 427/386 |

*Primary Examiner*—Howard S. Williams
*Attorney, Agent, or Firm*—Burton, Parker & Schramm

[57] ABSTRACT

The present invention concerns a coating composition comprising a dispersion, solution or suspension of a coating composition containing a nitrogen containing organic material which when heat cured contains at least 75% less amine value than present in the material prior to curing.

The present invention also concerns a method of electrodepositing a film forming substance onto a substrate by employing an anode, a cathode and an electrolyte therebetween comprising the steps:

A. providing an aqueous electrolyte containing said composition described above;
b. closing the circuit between the anode and the cathode; and
c. depositing the film forming composition on the cathodic substrate.

33 Claims, No Drawings

PROCESS FOR CATIONIC ELECTRODEPOSITION

CROSS REFERENCE TO RELATED CASES

This case is a continuation-in-part of U.S. Ser. No. 859,295 filed Dec. 12, 1977, now U.S. Pat. No. 4,155,824 entitled CATHODIC ELECTRO-DEPOSITION COMPOSITIONS EMPLOYING FATTY ACID DERIVATIVES, which is hereby incorporated by reference.

BACKGROUND OF THE INVENTION

It has become commercially of significance to employ cathodic electrodeposition coating compositions for improved corrosion resistance can be obtained employing said compositions.

U.S. Pat. No. 4,001,101 teaches the electrodeposition of epoxy compositions which contain boron in the form of boric acid and like compounds. U.S. Pat. No. 4,001,156 teaches a method of producing epoxy group containing quaternary ammonium salt containing resins.

SUMMARY OF THE INVENTION

The present invention is concerned with coating compositions and the cationic electrodeposition method of supplying said coating compositions to produce films on substrates having good corrosion resistant properties. For appropriate resins as acrylics or polyesters, improved properties of weather durability, particularly on exposure to sunlight and ultraviolet light can be obtained. The compositions can generally be characterized as being a dispersion, solution or suspension of a nitrogen containing organic material producing a compound having Formula A therein; which product when heat cured contains at least 75% less amine value than present in the material prior to curing;

wherein Formula A is:

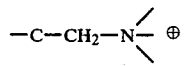

preferably the material is prepared by reacting an oxirane containing material and a nitrogen containing material wherein the oxirane containing material is an epoxy containing polymer and the nitrogen material is a tertiary amine salt of a carboxylic acid.

DESCRIPTION OF PREFERRED EMBODIMENTS

Formula A can be introduced into any resinous system. One way is to prepare quaternary amine materials by techniques well known in the art. One way is to react tertiary amines with a resinous halide. Suitable resinous halides are bromides, chlorides, fluorides and iodides. The resinous halide may be prepared by reacting the hydrogen halide with an ethylenically unsaturated resinous material. Suitable resinous materials are acrylics, polyesters, polyethers, alkyds, natural or synthetically prepared resin or rosins providing the polymerized resinous materials contain at least one ethylentically unsaturated group.

The oxirane containing materials that can be useful in the preparation of the product of the present invention can be selected from a variety of oxirane containing materials. A class of materials would be epoxy coating compositions. Suitable epoxy materials are epoxy resins obtained by reacting a dihydric phenol and an epihalohydrin. Suitable reactants include bis(4-hydroxy phenyl) dimethyl methane (BPA) and epichlorohydrin. Other suitable dihydric phenols include resorcinol; bis(4-hydroxy phenyl) methane; 1,1-bis(4-hydroxy phenyl) ethane; 1,1-bis(4-hydroxy phenyl) propane; 1,1-bis (4-hydroxy phenyl) butane; 2,2-bis(4-hydroxy phenyl) butane; and 1,1-bis(4-hydroxy phenyl) 2 methyl propane. Typical epoxy resins are those having an epoxy equivalent of between about 150 and 4000. It is preferred that the epoxy material be a solid at ambient temperature and pressure for a dipcoating composition and a liquid for electrocoating composition. Illustrative commercial resins that are suitable in the practice of the invention include the following:

| Epoxy Resin | Epoxide Equivalent Weight (Approximate) | Durrans Softening Point (Approximate) |
|---|---|---|
| Epi-Rex 530 C | 900 | 95–100° C. |
| Epon 1004 | 900 | 100° C. |
| Ciba Giegy 7014 | 770 | 94° C. |

It is to be appreciated that the phrase "epoxy" is meant to include those resins that contain the oxirane ring in the reactant. It is preferred that the epoxy compound employed be polymeric and that it contain more than 1 epoxy group per molecule, that is, that it have an epoxy equivalent greater than 1. Higher molecular weight epoxy materials can be obtained by reacting the polyglycidyl ether described above with a polyphenol, such as bisphenol-A.

While the polyglycidyl ethers of polyphenols may be employed per se, it is frequently desirable to react a portion of the reactive sites (for example, hydroxyl or in some instances epoxy) with a modifying material to vary the film characteristics of the resin. For example, the polyepoxide can be esterified with carboxylic acid, especially fatty acid. Especially preferred are unsaturated fatty acids. The fatty acids that may be employed are long chain fatty acids containing from 8 to 24 carbon atoms, preferably containing single and multiple sites of unsaturation. The most preferred fatty acids are the conjugated diene fatty acids. A preferred fatty acid is one having high conjugated diene concentration such as products available under the name Pamolyn (trademark of Hercules) especially Pamolyn 380 which has a high concentration of unsaturation at positions 9 and 11 of a $C_{18}$ fatty acid. Suitable fatty acids are caprylic, capric, lauric, myristic, palmitic, palmitoleic, stearic, oleic, ricinoleic, linoleic, linolenic, eleostearic, licanic, arachidic, arachidonic, behenic, clupanodonic, lignoceric, nisinic, and the like.

The preferred reaction is between an oxirane containing material and a tertiary amine salt. The reaction product produces a compound containing Formula B. Formula B is:

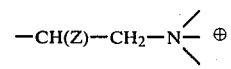

wherein Z is a hydroxyl group. For further modification of the polymer the hydroxyl group may be converted:

(a) to a ketone by reacting the product shown in Formula B with an oxidizing agent, such as permanganate, a chromic acid and the like, or (b) to a hydrogen atom by means of a Grignard type reaction such as by reacting the product shown in Formula B with HBr to convert the hydroxyl group beta to the nitrogen atom to the bromide form; then converting the bromide to a Grignard reagent by reaction with magnesium and then reacting that product with an alkanol such as methanol or propanol; or (c) to the alkoxy group by reaction with an alkyl halide; or (d) to the acyloxy form by esterification with a carboxylic acid; or (e) to the product containing

by reaction with an alkylene oxide of from two to four carbon atoms; or (f) to

by reacting with epihalohydrin and the like and then converting to the hydroxyl form by hydrolysis; or (g) to

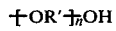

by reacting with a glycol, and the like.

Therefore it can be said that the polymer contains Formula B which is of the structure:

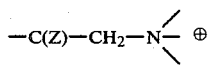

wherein Z is independently selected from the group consisting of hydrogen, hydroxyl, alkyl ether of from 1 to 6 carbon atoms acyloxy of from 1 to 6 carbon atoms; (=O, as in a ketone),

wherein R' is a saturated alkylene group of from 2 to 4 carbon atoms, and n is a number from 1 to 6.

Another useful class of polyepoxide is produced from Novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl)2,2-propane and the like. There can also be used polyglycidyl esters of polycarboxylic acids, which are produced by the reaction of epichlorohydrin or similar epoxy compounds with an aliphatic or aromatic polycarboxylic acid such as oxalic acid, succinic acid, glutaric acid, terephthalic acid, 2,6-naphthylene dicarboxylic acid, dimerized linolenic acid and the like. Examples are glycidyl adipate and glycidyl phthalate. Also useful are polyepoxides derived from the epoxidation of an olefinically unsaturated alicyclic compound. Included are diepoxides comprising in part one or more monoepoxides. These polyepoxides are non-phenolic and are obtained by the epoxidation of alicyclic olefins; for example, by oxygen and selected metal catalysts, by perbenzoic acids, by acetaldehyde monoperacetate, or by peracetic acid, and/or hydrogen peroxide. Among such polyepoxides are the epoxy alicyclic ethers and esters which are well known in the art.

A class of polyepoxides which may be employed is acrylic polymers containing epoxy groups. Preferably these acrylic polymers are polymers formed by copolymerizing an unsaturated epoxy-containing monomer, such as, for example, glycidyl acrylate or methacrylate (GMA), and at least one other unsaturated monomer.

Another class of epoxies are the cycloaliphatic epoxies whereby a saturated cycloaliphatic ring (e.g. 5 or 6 members) is fused to an oxirane ring, such as the bicyclo [4,1,0]-heptane-7-oxy or the bicyclo[3,1,0]-hexane-6-oxy.

Exemplary acrylic materials that may be employed as a copolymerizable monomer with the GMA type are acrylic or methacrylic acids, the alkylesters or hydroxyalkylesters thereof where the alkyl group has from 1 to 18 carbon atoms, such as isobornyl acrylate, methyl(meth)acrylate, butyl(meth) acrylate, 2-ethyl-hexyl(meth)acrylate, stearyl acrylate or methacrylate and the like, acrylamides, methacrylamides and the like. It is to be appreciated that other copolymerizable monomers may also be reacted with the acrylic material. Exemplary ethylenically unsaturated materials are styrene, vinyl toluene; 3,5-dimethyl styrene, p-tert-butyl styrene, alpha methyl styrene, and the like, unsaturated dicarboxylic acids or anhydrides and the alkylesters thereof from 1 to 18 carbon atoms, such as maleic anhydride, fumaric acid and the like.

A preferred class of acrylic reactants are those that contain the acrylic moiety together with an oxirane ring in the same molecule, such as glycidyl acrylate and methacrylate and other similar type materials such as those taught in U.S. Pat. No. 3,773,855, which is hereby incorporated by reference, such as acrylic and methacrylic esters of the monoglycidyl ether of sulfonyl bisphenol, the monoglycidyl ether of a $C_1$ to $C_{10}$ alkylene bisphenol, the monoglycidyl ether of oxybisphenol, the monoglycidyl ether of thiobisphenol, the monoglycidyl ether of aminobisphenol and the monoglycidyl ether of α,α-bis(p-hydroxyphenyl) tolylethane; the acrylic and methacrylic esters of 3-oxy-6,7-epoxyheptanol,3-aza-6,7-epoxyheptanol, or 3-thia-6,7-epoxyheptanol; the reaction products of one mole of acrylic or methacrylic acid with one mole of polyphenylenesulfide diglycidyl ether, polyphenyleneamine diglicidyl ether, or polyphenyleneoxide diglycidyl ether; the reaction products of one mole or acrylic acid or methacrylic acid with one mole of the polycondensation product of epichlorohydrin with sulfonyl bis(phenylmercaptan) or sulfonyl bisphenol; the reaction products of one mole of acrylic acid or methacrylic acid with one mole of the polycondensation product of epichlorohydrin with α,α-bis(p-hydroxyphenyl) tolylethane or α,α-bis(p-thiophenyl) tolylethane; the acrylic and methacrylic esters of poly ($C_1$–$C_4$ alkyleneoxide glycol) monoglycidyl ether; and the like.

By "acrylic" material is meant a polymer or copolymer containing therein the polymerized monomer moiety of the formula:

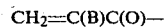

wherein B is hydrogen, methyl or ethyl.

While Applicant does not wish to be held to any theory as to operability of the invention, it is believed that when the nitrogen containing material is reacted with the oxirane containing material, the nitrogen is introduced into the molecule. That nitrogen can be used to permit the polymeric product to be electrodeposited onto the cathode during an electrodeposition process. When the cathodic substrate is subjected to a heat cure, it is believed that the nitrogen will separate from the remaining portion of the material by virtue of a Hoffman elimination reaction along the lines described below. It is believed, therefore, that the nitrogen is a volatile material. It is preferred that the nitrogen product be a quaternary ammonium salt solution of an acid in water.

Suitable nitrogen containing materials are nitrogen heterocyclic materials containing from 5 to 8 members with from 1 to 3 nitrogen atoms in the ring and may contain other hetero atoms such as oxygen and sulfur. Mononuclear as well as polynuclear ring systems may be employed. Exemplary materials are tertiary amines, N-alkyl succinimide, N-alkyl pyrrole, N-substituted pyrrolidine, N-substituted indole, pyridine, piperidine, quinoline, acridine, phenanthridine, pyrazole, pyrazine, imidazole, N-substituted hydantoin, isoxazole, thiazole, isothiazole, 1,2-diazine, 1,3-diazine, 1,4-diazine, N-substituted carbazole, pyrimidine, purine, phenazine, N-substituted tropane, N-substituted morpholine and the like and the water soluble or water dispersible alkyl, hydroxy, alkoxy and keto derivatives thereof, wherein the alkyl groups are sufficient to permit water solubility and may contain from 1 to 12 carbon atoms.

Of the above enumerated amines, N-methyl morpholine is the most preferred.

A preferred means of preparing the nitrogen containing organic material which is to be reacted with the oxirane containing material is to prereact an amine such as that described above with a water solubilizing acid, preferably a carboxylic acid. The amount of nitrogen material that is used together with water generally is a stoichiometric amount. The amount of water ranges from about 1 to 20 equivalents water to one equivalent of nitrogen material. It is to be appreciated that while the amount of solubilizing acid that may be used may vary substantially, it is preferred that the acid be sufficient to solubilize the nitrogen containing material in water.

The number of amine equivalent employed in the reaction between the amine and the oxirane containing materials is generally equivalent to the number of unreacted epoxy or oxirane equivalents present in the reaction medium. It may be expressed as: number of amine equivalent = number of oxirane equivalents. It is to be appreciated, however, that the number of amine equivalents can range from about 0.1 to about 10 times the number of epoxy equivalents to produce a product which has varying degrees of water solubility as well as having varying degrees of oxirane containing rings.

In curing the coating composition of the present invention, it has been found highly desirable that nitrogenous containing cross-linking agents be employed in an effective curing amount. Generally the amount of nitrogen containing material that is employed is sufficient to react with the hydroxyl groups present on the polymeric material and/or the number of hydroxyl groups present on Formula B contained in the polymeric material. If desired, the amount of fatty acid containing unsaturation may be increased to produce an air dried composition.

When a cross-linking agent is employed, it is preferred that a blocked isocyanate or a melamine type containing composition be used as the cross-linking agent. Other cross-linking agents may also be used such as urea formaldehyde, phenol formaldehyde, benzoguanamine, amide-imide, polyamide, polybenzimidazole, and the like.

Suitable isocyanates that may be used in the present invention are as follows:
propylene-1,2-diisocyanate,
butylene-1,3-diisocyanate,
butylene-1,2-diisocyanate,
hexamethylene diisocyanate,
octamethylene diisocyanate,
nonamethylene diisocyanate,
decamethylene diisocyanate,
2,11-diisocyano-dodecane and the like,
meta-phenylene diisocyanate,
para-phenylene diisocyanate,
toluene-2,4-diisocyanate,
toluene-2,6-diisocyanate,
xylene-2,4-diisocyanate,
xylene-2,6-diisocyanate,
dialkyl benzene diisocyanate, such as methylpropylbenzene diisocyanate, methylethylbenzene diisocyanate, and the like,
2-2'-biphenylene diisocyanate,
3,3'-biphenylene diisocyanate,
4,4'-biphenylene diisocyanate,
3,3'-dimethyl-4,4'-biphenylene diisocyanate, and the like,
methylene-bis-(4-phenyl isocyanate),
ethylene-bis-(4-phenyl isocyanate),
isopropylidene-bis-(4-phenyl isocyanate),
butylene-bis-(4-phenyl isocyanate),
hexafluoroisopropylidene-bis-(4-phenyl isocyanate), and the like,
2,2'-oxydiphenyl diisocyanate,
3,3'-oxydiphenyl diisocyanate,
4,4'-oxydiphenyl diisocyanate, and the like,
2,2'-ketodiphenyl diisocyanate,
3,3'-ketodiphenyl diisocyanate,
4,4'-ketodiphenyl diisocyanate,
2,2'-thiodiphenyl diisocyanate,
3,3'-thiodiphenyl diisocyanate,
4,4'-thiodiphenyl diisocyanate, and the like,
2,2'-sulfonediphenyl diisocyanate,
3,3'-sulfonediphenyl diisocyanate,
4,4'-sulfonediphenyl diisocyanate, and the like,
2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate),
4,4'-propylene-bis-cyclohexyl isocyanate),
bis-(para-isocyano-cyclohexyl) sulfide,
bis-(para-isocyano-cyclohexyl) sulfone,
bis-(para-isocyano-cyclohexyl) ether,
bis-(para-isocyano-cyclohexyl) diethyl silane,
bis-(para-isocyano-cyclohexyl) diphenyl silane,
bis-(para-isocyano-cyclohexyl) ethyl phosphine oxide,
bis-(para-isocyano-cyclohexyl) phenyl phosphine oxide,
bis-(para-isocyano-cyclohexyl) N-phenyl amine,
bis-(para-isocyano-cyclohexyl) N-methyl amine,
2,6-diisocyano-pyridine,
bis-(4-isocyano-phenyl) diethyl silane,
bis-(4-isocyano-phenol) diphenyl silane, dichloro-biphenylene diisocyanate, bis-(4-isocyanophenyl) ethyl phosphine oxide,
bis-(4-isocyano-phenyl) phenyl phosphine oxide,
bis-(4-isocyano-phenyl)-N-phenyl amine,
bis-(4-isocyano-phenyl)-N-methyl amine,
3,3'-dimethyl-4,4'-diisocyano biphenyl,
3,3'-dimethoxy-biphenylene diisocyanate,
2,4-bis-(-isocyano-t-butyl) toluene,
bis-(para-isocyano-t-butyl-phenyl) ether,
para-bis-(2-methyl-4-isocyano-phenyl) benzene,
3,3'-diisocyano adamantane,
3,3'-diisocyano biadamantane,
3,3''-diisocyanoethyl-1,1'-butadamantane,
1,2-bis-(3-isocyano-propoxy) ethane,
1,2-dimethyl propylene diisocyanate,
3-methoxy-hexamethylene diisocyanate,
2,5-dimethyl heptamethylene diisocyanate,
5-methyl-nonamethylene diisocyanate,
1,4-diisocyano-cyclohexane,
1,2-diisocyano-octadecane,
2,5-diisocyano-1,3,4-oxadiazole,
OCN(CH$_2$)$_3$(CH$_2$)$_2$O(CH$_2$)$_3$ NCO,
OCN(CH$_2$)$_3$ S(CH$_2$)$_3$ NCO,
OCN(CH$_2$)$_3$ N(CH$_2$)$_3$ NCO,
polymethylene polyphenyl isocyanate;
biurets of the formula

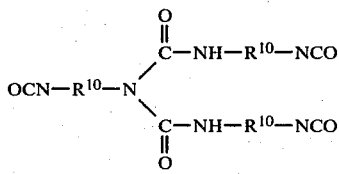

wherein R$^{10}$ is an alkylene group having 1–6 carbon atoms, especially preferred is the biuret of hexamethylene diisocyanate;

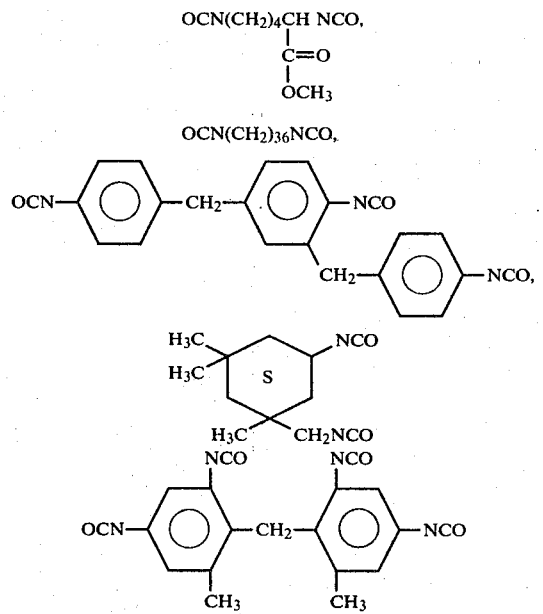

A number of blocking agents may also be used to produce a blocked isocyanate which could be used as the cross-linking agent. Such blocking agents as the phenol type, lactone type, active methylene type, alcohol type, mercaptan type, acid amide type, the imide, the amine type, the urea type, carbamate type, oxime type, sulfate type and the like. Most preferably a ketoxime type is preferred, and even more preferably a dialkyl ketoxime of from 1 to 4 carbon atoms per alkyl group. Most preferably the ketoxime would be methylethyl ketoxime, methyl-isobutyl ketoxime, and the like.

Suitable melamine type cross-linking agents are hexamethoxymethyl melamine, alkylated (melamine-formaldehyde), butylated melamines, and the like.

In order to prepare a coating composition suitable for extensive use other than as a primer and for economic reasons, melamine type agents are desired. To prepare a satisfactory cured product and to maintain a stable bath composition, it is desirable to operate the electrodeposition bath at a basic pH (>7.0). Melamine agents will self-cross link and coagulate and precipitate in the electrodeposition bath when the pH is acidic. A distinct advantage of the resin system of the present invention is that they are also stable in a basic bath.

In addition prior art basic pH cationic compositions did not produce a hard cured film when melamine was used as a cross linking agent. While Applicants do not wish to be restricted to one theory of operation of the invention, it is believed that during the curing of the coated substrate, the quaternary nitrogen is removed. The portion of the coating composition that remains on the coated substrate, accelerates the cure of the composition in the presence of the melamine agent. It is to be appreciated that appropriate acids may be present in the coating composition such as Friedel-Crafts catalysts as p-toluene sulfonic acid, phosphoric acid, methane sulfonic acid and the like.

The coating compositions of the present invention are useful in the cathodic electrodeposition of substrates. Generally, the bath pH ranges from about 3–9. The substrate may be any conductive substrate, preferably iron, zinc or aluminum containing substrates such as steel, with or without protective coatings, such as phosphate corrosion resistant coatings. Most preferably the coatings of the present invention are applied to metallic substrates, such as steel.

In the electrodeposition process, the conductive metallic substrate would be the cathode in the electrical process and an anode would be placed in the electrodeposition bath, with the electrodeposition coating of the present invention being incorporated in the aqueous electrolyte between the anode and the cathode. The electrodeposition process is one that would be conducted at a temperature ranging from about 50° F. to 150° F., preferably room temperature. The voltage may vary greatly, although normally it will operate between 0.5 and 500 volts. The current density ranges from about 0.1 amp to about 15 amps per square foot.

The nitrogen containing coating compositions of the present invention are solubilized, dispersed or suspended by means of an acid, such as an organic acid, such as acetic acid, lactic acid, citric acid and the like, although any water solubilizing agent may be used as boric or mineral acids, as hydrochloric acid, and the like.

As has been mentioned above, if a high concentration of unsaturated fatty acids are employed, the composition may be air cured. Preferably, however, the coating compositions are cured by means of subjecting the coated substrate to a high temperature or a bank of infrared lamps having a temperature ranging from about 225° F. (107° C.) to about 800° F. (427° C.), preferably between about 300° F. (149° C.) and about 390° F. (199° C.) from a time ranging from about 1 second to 1 hour, preferably 15 minutes to 45 minutes. The shorter times and higher temperatures are used in such industries as the coil coating industry and the like.

It is to be appreciated that a curing catalyst may also be added to the coating composition, such as tin compounds as dibutyl tin dilaurate, dibutyl tin diacetate dibutyl tin oxide, metallic dryers as cobalt and zirconium naphthenate or octoate.

When a blocked isocyanate is employed as described above, it is to be appreciated that the blocking agent will decompose at temperatures greater than 50° C. which will permit the remaining isocyanate moiety to react with the film forming composition. At least than about 50° C., the blocked isocyanate is substantially stable and is nonreactive with the hydroxyl groups present on the acrylic polymer, or the hydroxyl groups present on Formula A moiety.

In known manner, catalysts, pigments, anti-oxidants, surfactants or fillers may be added to the coating composition to improve the appearance, texture, gloss and other properties of the cured film. Pigments such as carbon black, silica and silicates, titanium dioxide, metal oxides, chromates, sulfates and the like may be used.

The amount of cross-linking agent employed will range from about 1% to about 50%, preferably about 20% to about 30% by weight of the total resin plus cross-linking agent, especially when a melamine resin is used. The cross-linking agent is used (on an equivalent basis) especially when an isocyanate cross-linking agent is used in a range of 1:0.5–1.5:0H/NCO. To increase adhesion of coating substrates hydroxyl groups are present. On the other hand, an increase in NCO content is required for proper crosslinking.

Having described the invention in general, listed below are embodiments wherein all parts are in parts by weight and all temperatures are in degrees Centigrade, unless otherwise indicated.

EXAMPLE I

The coating composition was formulated from the ingredients and process described below:

|  | Parts By Weight | Equivalents |
|---|---|---|
| Epon 829 (trademark of Shell Oil of the reaction product of epichlorohydrin and BP-A) | 932.4 | 4.78 |
| Bisphenol A (BP-A) | 317.6 | 2.78 |
| Linseed Fatty Acid | 313.6 | 1.12 |
| Triethyl Amine | 0.5 |  |
| Butyl Cellosolve (trademark of Union Carbide for ethylene glycol monobutyl ether) | 460.0 |  |
| N-methylmorpholine | 88.9 | 0.88 |
| Deionized Water | 72.4 | 4.02 |
| Acetic Acid | 39.6 | 0.66 |

The Epon 829 and Bisphenol A were charged to a reaction vessel equipped with a stirrer, thermometer, inert gas purge and condenser. The mixture was heated, with stirring, to 140° C. over a period of 30 minutes. The temperature was allowed to rise to 175°–180° C. (heat of exotherm) and held for 30 minutes. The linseed fatty acid and triethylamine were charged and the reaction mixture was held at 180° until an acid number of less than one was achieved. The butyl cellosolve was then charged and the solution cooled to 95° C. The N-methylmorpholine, deionized water and acetic acid were premixed and charged to the reactor and the solution heated to 90°–95° C. and held for 5 hours (until a sample was water soluble). The resin was then cooled to room temperature having a theoretical solids value of 72.4% and an amine value of 29. A 2 g. sample of the product was placed in an aluminum dish and baked for 30 minutes at 350° F. and the cured film was redissolved in tetrahydrofuran and determined to have an amine value of 1.2 (0.021 milliequivalents per gram), a reduction of about 96% of amine value.

A pigment dispersion was prepared by grinding a mixture of 295.8 g. of the above described resin (Resin A), 256.2 g. of isobutyl alcohol, and 48 g. of carbon black in a pebble mill to a Hegman N.S. 7+grind.

An electrodepositable composition was prepared by combining 60 g. of the above pigment dispersion with 298.5 g. of Resin A, 2.4 g. of Modaflow (trademark of Monsanto for a polyacrylic flowing agent), 0.9 g. of 12% manganese naphthenate, 0.9 g. of 12% cobalt naphthenate. 1,917.3 g. deionized water was slowly added, while mixing, to produce a bath containing approximately 10% solids.

The electrodeposition bath had a pH of 7.5 and conductivity of 783 microhms. It had a Ford throw power (box penetrating test) of 7.8 inches.

The composition was applied, by electrodeposition, to unpolished bare steel panels and also to zinc phosphated steel panels serving as the cathode. The panels were coated at 325 volts for 2 minutes and baked 10 minutes at 400° F. The film builds were 0.70–0.75 mils on the zinc phosphated steel and 0.90 mils on bare steel and all exhibited 6H penical hardness and 60° gloss of 90–95%.

After exposure to 336 hours in a salt spray cabinet, the coating on the bare steel showed 3 mm pull from the scribe. After exposure to over 500 hours in a salt spray cabinet, the coating over zinc phosphated steel was unaffected.

EXAMPLE II

A dip coating composition was formulated from the ingredients and process described below:

|  | Parts By Weight | Equivalents |
|---|---|---|
| Epon 829 | 673.2 | 3.45 |
| Bisphenol A | 326.8 | 2.86 |
| Butyl Cellosolve | 355.6 |  |
| N-Methylmorpholine | 50.5 | 0.50 |
| Acetic Acid | 22.5 | 0.38 |
| Deionized Water | 200.0 |  |
| Deionized Water | 871.4 |  |

Resin Procedure

The Epon 829 and Bisphenol A were charged to a reaction vessel equipped with a stirrer, thermometer, inert gas purge and condenser. The mixture was heated, with stirring, to 140° C. over a 30 minute period and allowed to exotherm to 175°–180° C., maintaining this temperature for 30 minutes. Butyl Cellosolve was then charged and the solution cooled to 95° C. A premix of acetic acid, N-methylmorpholine and 200 g. deionized water was charged and the solution heated to 90°–95° and held until clear (1-2 hours).

The resin was then reduced with 871.4 g. of deionized water to yield a solution containing 28.8% solids and having a pH of 8.9. The solution had a viscosity of 128 cps (Brookfield, #2 spindle at 50 rpm) and an amine value of 35.6 (0.634 milliequivalents per gram). A 2 g. sample was baked for 30 minutes at 350° F. and redissolved in tetrahydrofuran and determined to have an amine value of 3.2 (0.057 milliequivalents per gram), a reduction of about 91% of amine value.

100 g. of the above solution were combined with 7.2 g. Cymel 300 (trademark of American Cyanamide for melamine type cross linking agent), 0.4 g. paratoluenesulfonic acid and 20 g. deionized water to produce a solution containing 28.5% solids and having a pH of 7.7. Films were applied to unpolished bare steel panels by dipping the substrate into the coating composition formation just described. The coatings were allowed to flash for 5 minutes at room temperature followed by baking for 30 minutes at 385° F. The resultant films were glossy, free of film defects, had excellent adhesion, 6H pencil hardness and withstood 50 double rubs with a cloth saturated with methylethyl ketone. After 336 hours exposure in a salt spray cabinet, the film was still intact, exhibiting only 1 mm creep from the scribe.

What is claimed is:

1. The method of electrodepositing a film forming substance onto a substrate by employing an anode, a cathode and an electrolyte therebetween comprising the steps:
   a. providing an aqueous electrolyte containing a coating composition comprising a dispersion, solution or suspension of a coating composition containing a nitrogen heterocyclic organic material which contains no NCO groups;
   b. closing the circuit between the anode and the cathode;
   c. depositing the film forming composition on the cathodic substrate; and
   d. curing the composition by subjecting the coated substrate to heat and removing the amine value such that at least 75% less amine value is present in the nitrogen containing organic material than present in the material prior to curing.

2. The method of claim 1 wherein the nitrogen containing material is a water solubilized quaternary ammonium salt of an acid.

3. The method of claim 2 wherein the nitrogen material is prepared by reacting an oxirane containing material with a tertiary amine salt.

4. The method of claim 3 wherein the oxirane containing material is an epoxy resin.

5. The method of claim 3 wherein the oxirane containing material is a copolymer of an acrylic resin.

6. The method of claim 3 wherein the ratio of equivalents of oxirane rings to nitrogen ranges from 0.1–10 to 1.

7. The method of claim 2 wherein the nitrogen containing organic material is comprised of a water solubilized nitrogen heterocyclic material.

8. The method of claim 7 wherein the nitrogen heterocyclic material is comprised of a 5 to 7 membered ring with 1 to 3 nitrogen atoms within the ring and the alkyl, hydroxy, alkoxy and keto derivatives thereof.

9. The method of claim 8 wherein the nitrogen heterocyclic material is N-alkyl morpholine.

10. The method of claim 2 wherein the nitrogen material contains Formula B therein, wherein Formula B is:

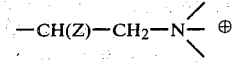

wherein Z is independently selected from the group consisting of hydrogen, hydroxyl, alkyl ether of from 1 to 6 carbon atoms, acyloxy of from 1 to 6 carbon atoms;

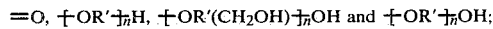

where R' is a saturated alkylene group of from 2 to 4 carbon atoms and n is a number from 1 to 6.

11. The method of claim 1 further comprising an effective amount of a nitrogenous cross-linking material.

12. The method of claim 1 wherein the aqueous electrolyte has a pH of at least 7.

13. The method of claim 1 wherein the coating composition contains a phenol formaldehyde cross-linking agent.

14. The method of claim 1 wherein the nitrogen heterocyclic containing material is further characterized as containing unsaturation from a fatty acid moiety.

15. An article produced according to the process of claim 1.

16. The method of claim 1 wherein the coating compositions contains as a cross-linking agent a melamine agent.

17. The method of coating a substrate comprising applying a dispersion, solution or suspension of a coating composition containing a nitrogen heterocyclic organic material which contains no NCO groups onto a substrate and heating the coated substrate, thereby curing the coating composition wherein the cured composition contains 75% less amine value than present in the material prior to curing.

18. The method of claim 17 wherein the coating composition contains melamine and an acid catalyst.

19. The method of claim 17 wherein the nitrogen containing material is a water solubilized quaternary ammonium salt of an acid.

20. The method of claim 19 wherein the nitrogen material is prepared by reacting an oxirane containing material with a tertiary amine salt.

21. The method of claim 20 wherein the oxirane containing material is an epoxy resin.

22. The method of claim 20 wherein the oxirane containing material is a copolymer of an acrylic resin.

23. The method of claim 20 wherein the ratio of equivalents of oxirane rings to nitrogen ranges from 0.1–10 to 1.

24. The method of claim 19 wherein the nitrogen containing organic material is comprised of a water solubilized nitrogen heterocyclic material.

25. The method of claim 24 wherein the nitrogen heterocyclic material is comprised of a 5 to 7 membered ring with 1 to 3 nitrogen atoms within the ring and the alkyl, hydroxy, alkoxy and keto derivatives thereof.

26. The method of claim 25 wherein the nitrogen heterocyclic material is N-alkyl morpholine.

27. The composition of claim 19 wherein the nitrogen material contains Formula B therein, wherein Formula B is:

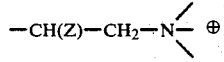

wherein Z is independently selected from the group consisting of hydrogen, hydroxyl, alkyl ether of from 1 to 6 carbon atoms, acyloxy of from 1 to 6 carbon atoms;

$=O$, $+OR'\frac{}{}_nH$, $+OR'(CH_2OH)\frac{}{}_nOH$ and $+OR'\frac{}{}_nOH$;

where R' is a saturated alkylene group of from 2 to 4 carbon atoms and n is a number from 1 to 6.

28. The method of claim 17 further comprising an effective amount of a nitrogenous cross-linking material.

29. The method of claim 17 wherein the coating composition has a pH of at least 7.

30. The method of claim 17 wherein the coating composition further comprises a phenol formaldehyde cross-linking agent.

31. An article produced according to the process of claim 17.

32. The method of claim 17 wherein the nitrogen heterocyclic containing material is further characterized as containing unsaturation from a fatty acid moiety.

33. The method of claim 17 wherein the coating composition contains as a cross-linking agent a melamine agent.

* * * * *